(12) United States Patent
Schmidt et al.

(10) Patent No.: US 7,529,200 B2
(45) Date of Patent: May 5, 2009

(54) METHOD AND SYSTEM FOR FAST SETUP OF GROUP VOICE OVER IP COMMUNICATIONS

(75) Inventors: Christopher M. Schmidt, Rockville, MD (US); Daniel L. Becker, Frederick, MD (US); Patrick J. Foy, Gaithersburg, MD (US)

(73) Assignee: 3E Technologies International, Inc., Rockville, MD (US)

( * ) Notice: Subject to any disclaimer, the term of this patent is extended or adjusted under 35 U.S.C. 154(b) by 993 days.

(21) Appl. No.: 10/897,484

(22) Filed: Jul. 23, 2004

(65) Prior Publication Data

US 2005/0073964 A1    Apr. 7, 2005

Related U.S. Application Data

(60) Provisional application No. 60/490,358, filed on Jul. 24, 2003.

(51) Int. Cl.
*H04L 12/16* (2006.01)

(52) U.S. Cl. .................. 370/260; 370/399; 709/227; 709/238; 455/519

(58) Field of Classification Search ................. 370/352; 709/246, 203; 455/519, 509, 515
See application file for complete search history.

(56) References Cited

U.S. PATENT DOCUMENTS

| | | | |
|---|---|---|---|
| 5,724,412 A | 3/1998 | Srinivasan |
| 5,805,587 A | 9/1998 | Norris |
| 5,907,547 A | 5/1999 | Foladare |
| 5,937,041 A | 8/1999 | Cardillo |
| 5,995,606 A | 11/1999 | Civanlar |
| 6,031,904 A | 2/2000 | An |
| 6,061,347 A | 5/2000 | Hollatz |
| 6,061,728 A | 5/2000 | Mead |
| 6,064,653 A | 5/2000 | Farris |
| 6,069,890 A | 5/2000 | White |
| 6,092,178 A | 7/2000 | Jindal |
| 6,157,648 A | 12/2000 | Voit |
| 6,175,869 B1 | 1/2001 | Ahuja |
| 6,185,194 B1 | 2/2001 | Musk |
| 6,192,045 B1 | 2/2001 | Williams |
| 6,233,318 B1 | 5/2001 | Pickard |
| 6,243,373 B1 | 6/2001 | Turock |
| 6,243,443 B1 | 6/2001 | Low |
| 6,260,070 B1 | 7/2001 | Shah |
| 6,263,371 B1 | 7/2001 | Geagan |
| 6,272,126 B1 | 8/2001 | Strauss |

(Continued)

OTHER PUBLICATIONS

International Search Report for PCT/US2004/023,724 (2 pages).

*Primary Examiner*—Fan Tsang
*Assistant Examiner*—Simon King
(74) *Attorney, Agent, or Firm*—Lesavich High-Tech Law Group, P.C.; Stephen Lesavich

(57) ABSTRACT

A method and system for fast setup of group Voice over Internet Protocol (VoIP) communications. The method and system provide a lower VoIP signaling overhead and a faster setup-time of group calls such as N-way audio and/or audio-video conference calls. Multi-party VoIP connections are quickly set-up over one or more virtual communications channels established between plural network devices using a session layer application, one or more group transport layer ports and a broadcast destination network address.

14 Claims, 9 Drawing Sheets

U.S. PATENT DOCUMENTS

| | | |
|---|---|---|
| 6,278,704 B1 | 8/2001 | Creamer |
| 6,292,480 B1 | 9/2001 | May |
| 6,295,276 B1 | 9/2001 | Datta |
| 6,298,120 B1 | 10/2001 | Civanlar |
| 6,307,930 B1 | 10/2001 | Mayer |
| 6,314,105 B1 | 11/2001 | Luong |
| 6,324,280 B2 | 11/2001 | Dunn |
| 6,327,267 B1 | 12/2001 | Valentine |
| 6,327,622 B1 | 12/2001 | Jindal |
| 6,333,931 B1 | 12/2001 | LaPier |
| 6,381,320 B1 | 4/2002 | Creamer |
| 6,389,005 B1 | 5/2002 | Cruickshank |
| 6,400,707 B1 | 6/2002 | Baum |
| 6,404,870 B1 | 6/2002 | Kia |
| 6,442,169 B1 | 8/2002 | Lewis |
| 6,477,150 B1 | 11/2002 | Maggenti |
| 6,490,274 B1 | 12/2002 | Kim |
| 6,496,477 B1 | 12/2002 | Perkins |
| 6,539,077 B1 | 3/2003 | Ranalli |
| 6,584,490 B1 | 6/2003 | Schuster |
| 6,704,305 B2 | 3/2004 | Emerson |
| 6,909,903 B2 | 6/2005 | Wang |
| 7,257,106 B2 | 8/2007 | Chen |
| 7,295,831 B2 | 11/2007 | Coleman |
| 7,333,482 B2 * | 2/2008 | Johansson et al. ........... 370/353 |
| 7,336,942 B2 | 2/2008 | Wang |
| 7,382,786 B2 | 6/2008 | Chen |
| 7,394,819 B2 | 7/2008 | Chen |
| 7,397,807 B2 | 7/2008 | Chen |
| 7,424,024 B2 | 9/2008 | Chen |
| 2001/0010690 A1 | 8/2001 | Shen |
| 2001/0012285 A1 | 8/2001 | Shaharabani |
| 2001/0032234 A1 | 10/2001 | Summers |
| 2001/0055299 A1 | 12/2001 | Kelly |
| 2002/0024943 A1 | 2/2002 | Karaul |
| 2002/0041590 A1 | 4/2002 | Donovan |
| 2002/0057672 A1 | 5/2002 | Komuro |
| 2002/0057677 A1 | 5/2002 | Katzschner |
| 2003/0028648 A1 * | 2/2003 | Calhoun .................... 709/227 |
| 2003/0056015 A1 | 3/2003 | Hieb |
| 2003/0058827 A1 | 3/2003 | Chow |
| 2003/0153341 A1 * | 8/2003 | Crockett et al. ............. 455/519 |
| 2003/0169752 A1 | 9/2003 | Chen |
| 2004/0047310 A1 | 3/2004 | Chen |
| 2005/0037733 A1 | 2/2005 | Coleman |
| 2005/0089052 A1 | 4/2005 | Chen |
| 2005/0288035 A1 | 12/2005 | Wang |
| 2006/0041431 A1 * | 2/2006 | Maes ..................... 704/270.1 |
| 2007/0005804 A1 * | 1/2007 | Rideout .................... 709/246 |
| 2008/0102797 A1 | 5/2008 | Coleman |

* cited by examiner

GROUP DISPATCH VoIP PROTOCOL MESSAGE

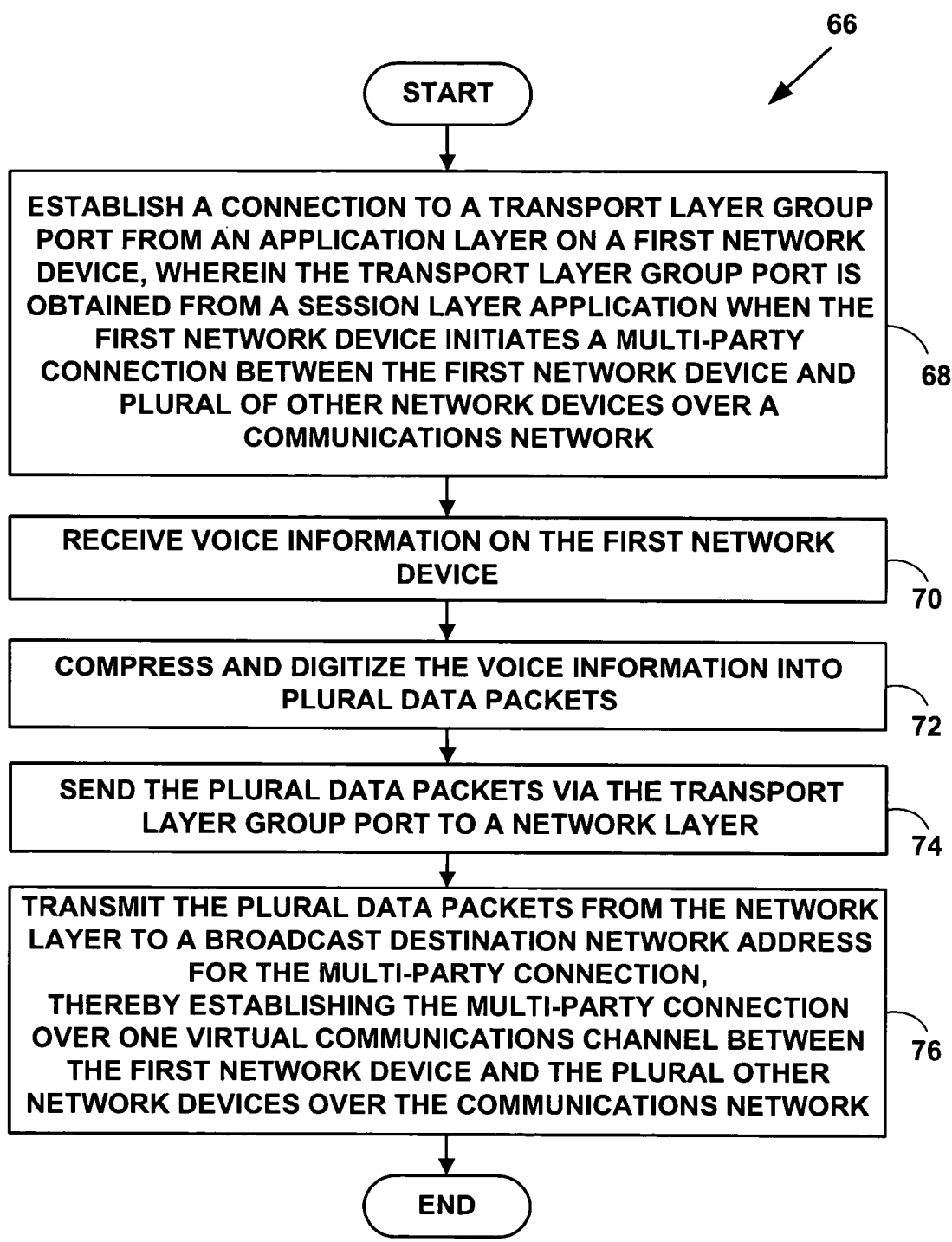

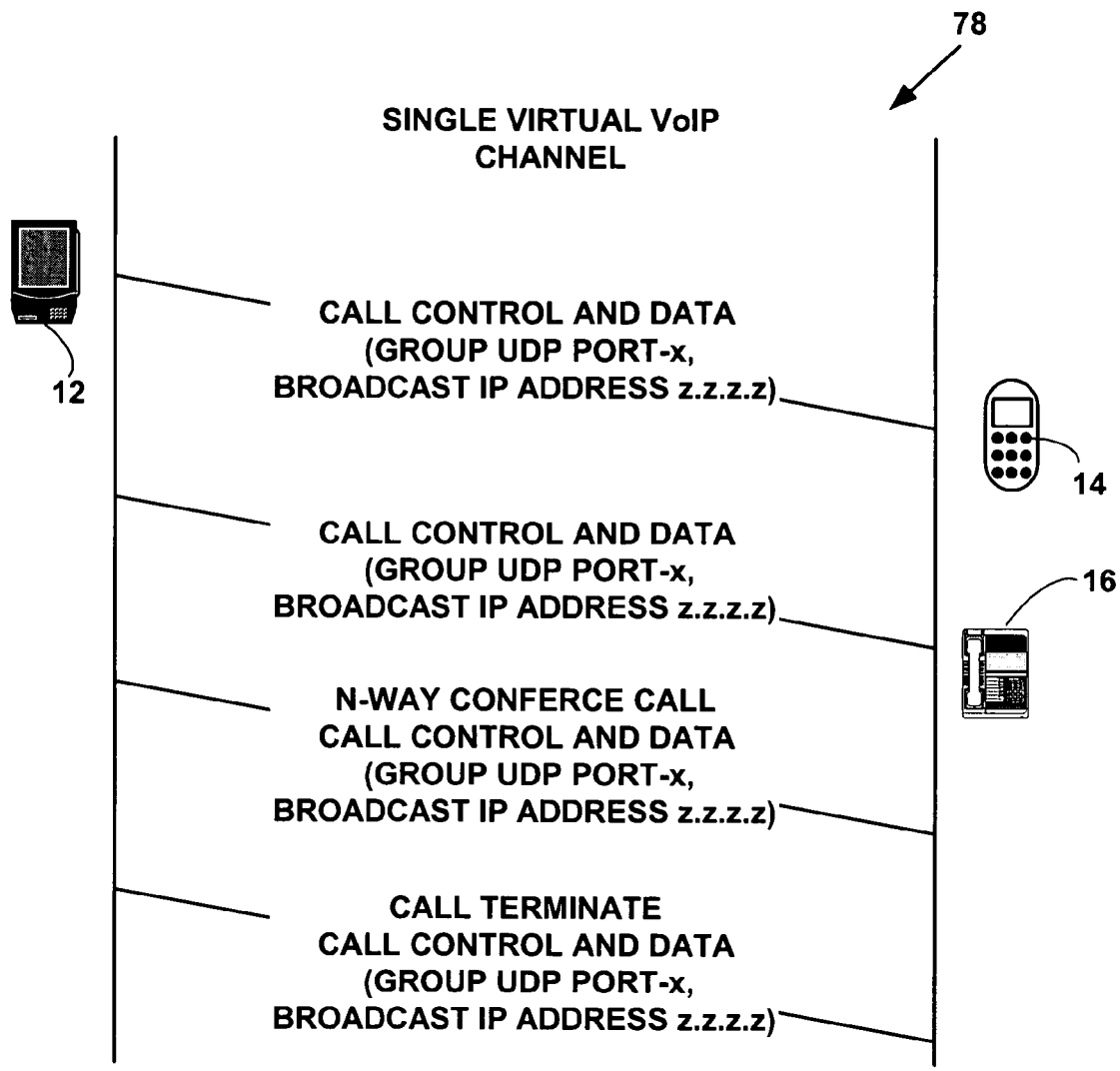

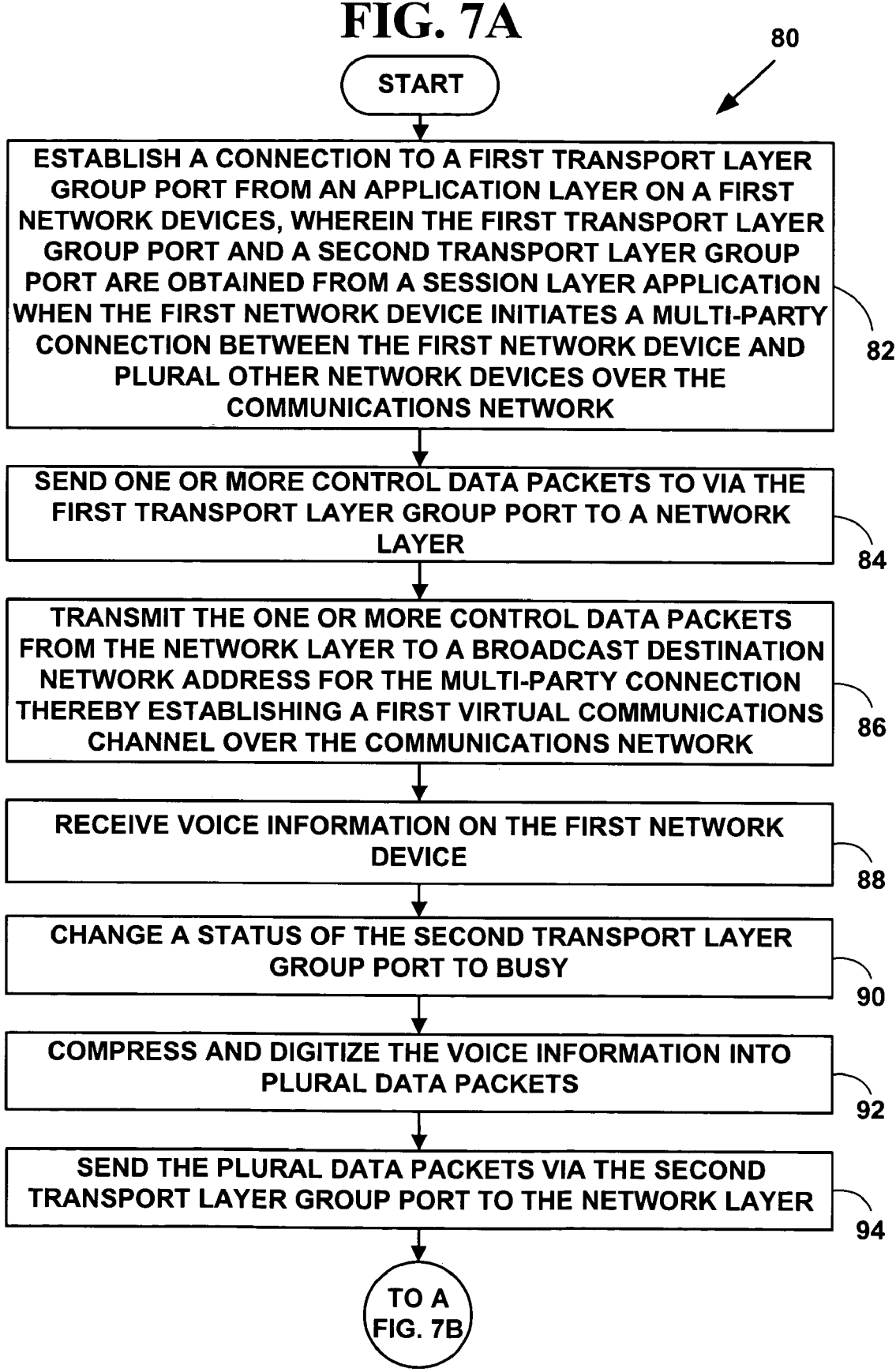

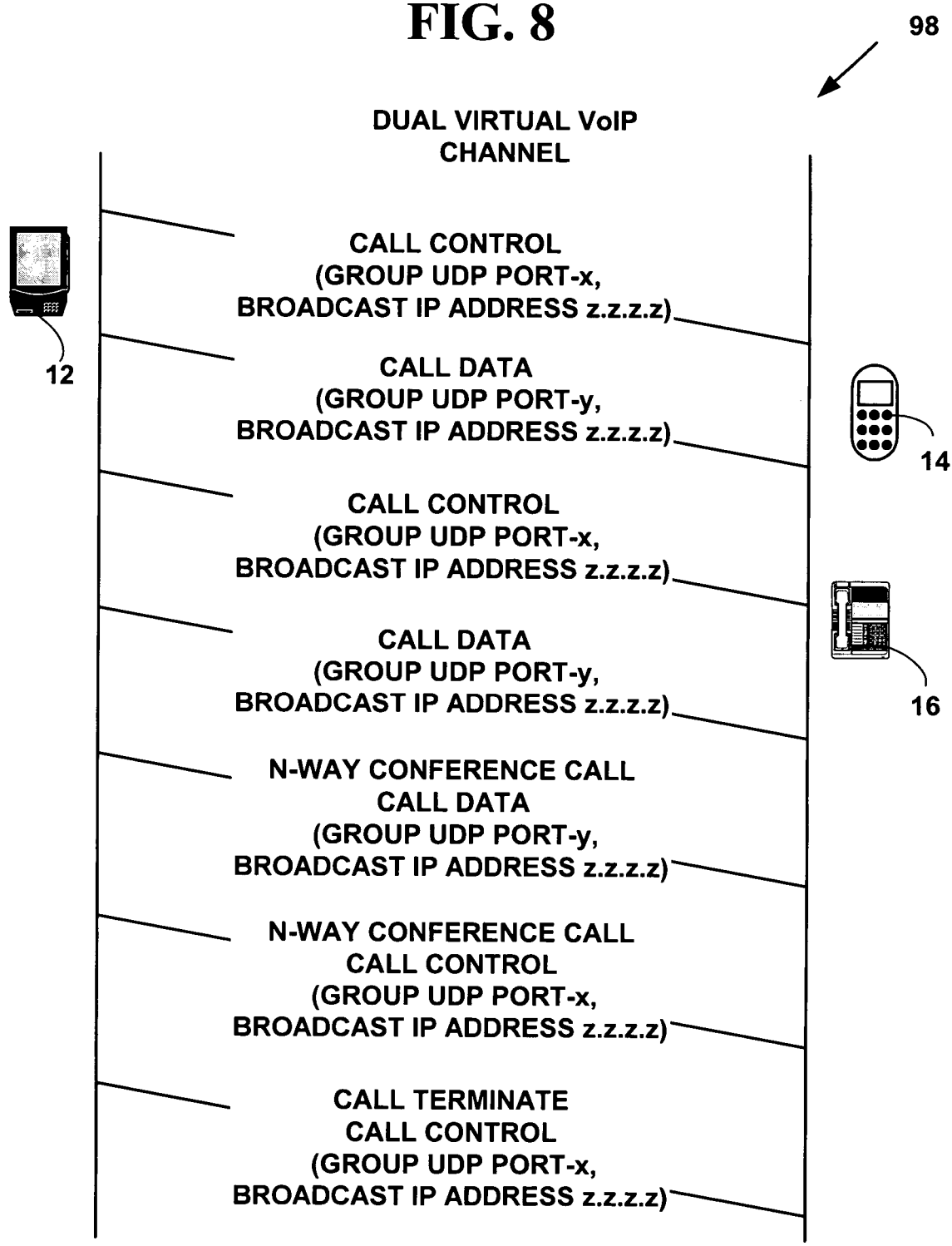

METHOD AND SYSTEM FOR FAST SETUP OF GROUP VOICE OVER IP COMMUNICATIONS

CROSS REFERENCES TO RELATED APPLICATIONS

This application claims priority to U.S. Provisional Application 60/490,358, filed on Jul. 24, 2003, the contents of which are incorporated by reference.

FIELD OF THE INVENTION

This invention relates to voice and data communications. More specifically, it relates to a method and system for fast setup of group voice over Internet Protocol communications.

BACKGROUND OF THE INVENTION

Voice delivered using the Internet Protocol (IP), or Voice over IP (VoIP) is a set of facilities for managing the delivery of voice information using IP packets. In general, this VoIP is used to send voice (and video) information in digital form in discrete data packets (i.e., IP packets) over data networks rather than using traditional circuit-switched protocols used on the public switched telephone network (PSTN). VoIP is used on both wireless and wired data networks.

There are many problems associated with using VoIP. One problem is that existing VoIP protocols (e.g., H.323, H.324, SIP, etc.) typically require a sequence of messages (exchanging capabilities, checking availability, registering with servers, etc.) before voice communications can begin—thus requiring rather large call setup times. These protocols were primarily designed to simulate single user PSTN connections between a network endpoint and either another network end point or a PSTN endpoint.

Another problem is that communicating with multiple user's simultaneously (i.e., N-way conferencing) using VoIP typically requires additional messaging, additional infrastructure components and a separate IP session with each user. If the number of user's to communicate with is large, the call setup time and bandwidth utilization can quickly become unmanageable.

Another problem is that Traditional Land Mobile Radio systems (e.g., EDACS, Astra, LMR, etc.) provide fast setup half-duplex conferencing voice communications (i.e., group calls) through a proprietary wireless voice communications system. These systems are traditionally circuit switched and design for wide area coverage. See e.g., U.S. Pat. No. 6,330,224, entitled "System for digital radio communication between a wireless lan and a PBX," that issued to Swartz et al. These systems are expensive and not conducive to many enterprise environments and not easily usable for VoIP N-way conference calls.

Thus it is desirable to quickly and efficiently set-up N-way conference calls using VoIP.

SUMMARY OF THE INVENTION

In accordance with preferred embodiments of the present invention, some of the problems associated with using VoIP to create group calls or group conference calls are overcome. A method and system for fast setup of group voice over Internet Protocol communications is presented.

The method and system may provide a lower VoIP signaling overhead and a faster setup-time of group calls such as N-way conference calls. Multi-party VoIP connections are quickly set-up over one or more virtual communications channels established between plural network devices using a session layer application, one or more group transport layer ports and a broadcast destination network address.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the invention are described with reference to the following drawings, wherein:

FIG. 5 is a flow diagram illustrating a method for providing multi-party connections over a communications network over a single virtual channel;

FIG. 6 is a data flow diagram illustrating a data flow for the method of FIG. 5;

FIGS. 7A and 7B are a flow diagram illustrating a method for providing multi-party connections over a communications network over dual virtual channels; and FIG. 8 is data flow diagram illustrating a data flow for the method of FIG. 7.

DETAILED DESCRIPTION OF THE INVENTION

Figure 1:
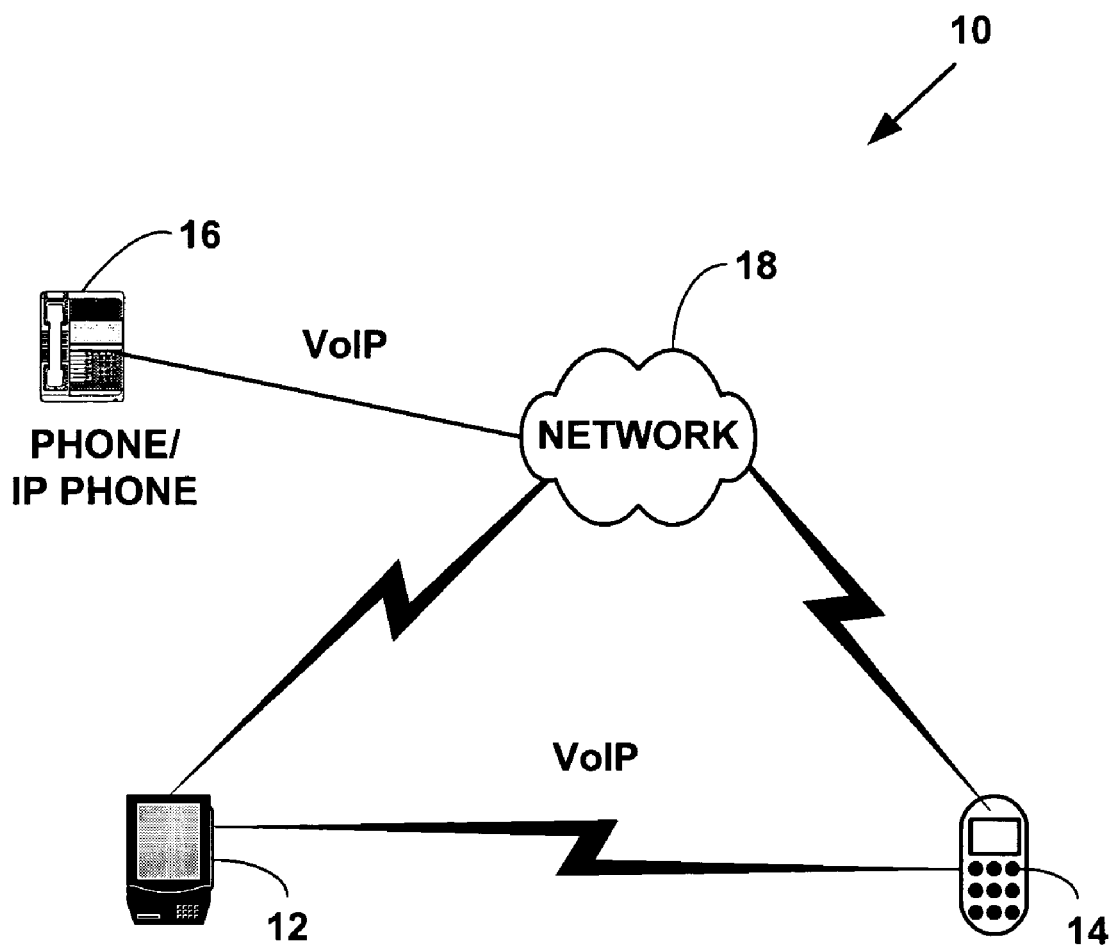
FIG. 1 is a block diagram illustrating an exemplary communications system.

FIG. 1 is a block diagram illustrating an exemplary communications system 10. The exemplary communications system 10 includes plural network devices 12, 14, 16 (three of which are illustrated). The plural network devices 12, 14, 16 include, but are not limited to, multimedia capable computers, facsimile machines, mobile phones, non-mobile phones, Internet phones, Internet appliances, personal digital/data assistants ("PDA"), two-way pagers and other types of network devices. The plural network devices 12, 14, 16 include one or more of a wired interface and/or a wireless interface used to connect to a communications network 18 to provide voice, video and data communications.

The communications system 10 further includes a communications network 18. The communications network 18 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 18 providing voice, video and data communications.

The communications network 18 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 18 may also include one or more servers or access points (AP) including wired and wireless access points (WAP) (not illustrated).

The communications network 18 includes data networks using the Transmission Control Protocol (TCP), User Datagram Protocol (UDP), Internet Protocol (IP) and other data protocols.

The communications network 18 may also include portions of a PSTN or cable television network that connect the network devices 12, 14, 16 via one or more twisted pairs of copper wires, coaxial cable, fiber optic cable, other connection media or other connection interfaces. The PSTN is any public switched telephone network provided by AT&T, GTE, Sprint, MCI, SBC, Verizon and others.

Preferred embodiments of the present invention includes network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, or the ADSL Forum. However, network devices and interfaces based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

An operating environment for network devices and interfaces of the present invention include a processing system with one or more high speed Central Processing Unit(s) ("CPU") or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection ("OSI") reference model is a layered architecture that standardizes levels of service and types of interaction for network devices exchanging information through a communications network. The OSI reference model separates network device-to-network device communications into seven protocol layers, or levels, each building and relying upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

In one embodiment of the present invention, the wireless interfaces used for the plural network devices 12, 14, 16 include but are not limited to, an IEEE 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN), "RF Home" or other wireless interfaces.

As is known in the art, 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11protocols defined. The IEEE 802.11a, 802.11b and 802.11g standards are incorporated herein by reference.

As is known in the art, Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

Protocol Stack

Figure 2:
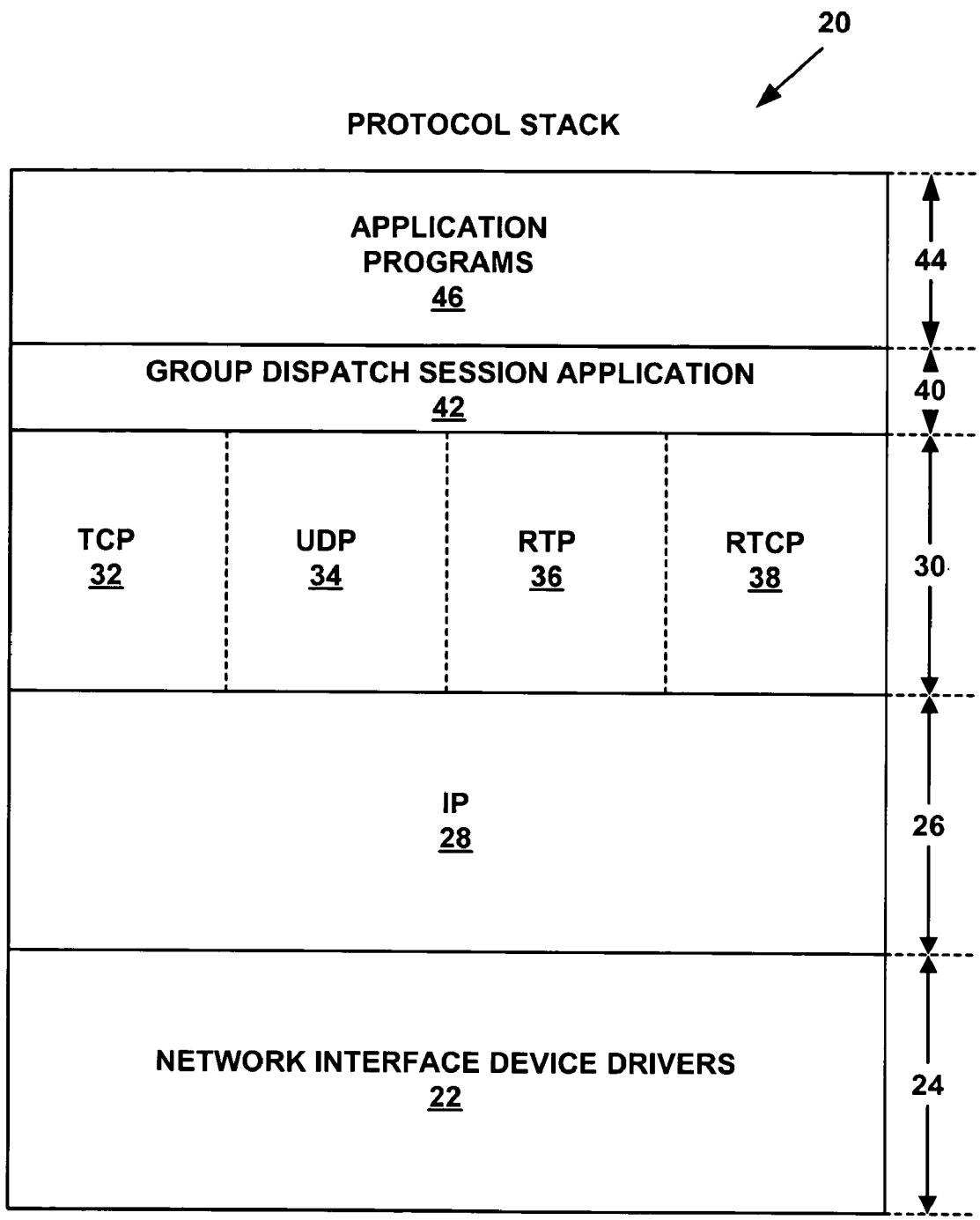
FIG. 2 is a block diagram illustrating a layered protocol stack.

FIG. 2 is a block diagram illustrating a layered protocol stack 20 for network devices 12, 14, 16. The layered protocol stack 20 is described with respect to Internet Protocol suites comprising in general from lowest-to-highest, a link, network, transport, session and application layer. However, more or fewer layers could also be used, and different layer designations could also be used for the layers in the protocol stack 20 (e.g., layering based on the Open Systems Interconnection ("OSI") model including from lowest-to-highest, a physical, data-link, network, transport, session, presentation and application layer.).

The plural network devices 12, 14, 16, are connected to the communications network 18 with Network Interface Card ("NIC") device drivers 22 in a link layer 24 for connecting the network devices to the communications network 18. For example, the NIC device drivers 34 may include a serial port device driver, a modem device driver, an Ethernet device driver, a wireless interface device driver, etc. The device drivers interface with the actual hardware being used to connect the plural network devices to the communications network 18.

Above the link layer 24 is a network layer 26 (also called the "Internet Layer" for IP suites). The network layer 26 includes, but is not limited to, an IP application 28, hereinafter IP 28. As is known in the art, IP 28 is an addressing protocol designed to route traffic within a network or between networks. IP 28 is described in IETF Request For Comments (RFC)-791, the contents of which are incorporated herein by reference. However, more fewer or other protocols can also be used in the network layer 26, and the present invention is not limited to IP 28.

Above network layer 26 is a transport layer 30. The transport layer 30 includes, but is not limited to, a TCP application 32, a UDP application 34, a Real-Time Protocol (RTP) application 36 and a (RTCP) application 38. However, more, fewer or other protocols could also be used in the transport layer 30.

The TCP application 32, hereinafter TCP 32, provides a connection-oriented, end-to-end reliable protocol designed to fit into a layered hierarchy of protocols which support multi-network applications. TCP 32 provides for reliable inter-process communication between pairs of processes in network devices attached to distinct but interconnected networks. For more information on TCP 32 see ITEF RFC-793, the contents of which are incorporated herein by reference.

The UDP application 34, hereinafter UDP 34, provides a connectionless mode of communications with datagrams in an interconnected set of computer networks. UDP 34 provides a transaction oriented datagram protocol, where delivery and duplicate packet protection are not guaranteed. For more information on UDP 34 see IETF RFC-768, the contents of which incorporated herein by reference. Both TCP 32 and UDP 34 are not required in protocol stack 20 and TCP 32 or UDP 34 can be used alone without the other.

The RTP application 36, hereinafter RTP 36, provides a transport protocol used in delivering real-time data, including audio and video. RTP 36 works with both unicast (single sender, single recipient) and multicast (single sender, multiple recipient) services. For more information on RTP 36, see IETF RFC-1889, and RFC-3350 the contents of which are incorporated by reference.

The RTCP application 38, hereinafter RTCP 38, provides a control protocol for the delivery of streamed multimedia data over IP 28 networks. RTCP 38 is designed to deliver real-time, live, or stored audio and video efficiently over a communications network 18. It can be used either for groups of recipients or for on-demand delivery to a single recipient. For more information on RCTP 38, see IETF RFC-3350, the contents of which are incorporated by reference.

Above the transport layer 30 is a session layer 40 where a Group Dispatch Session application 42 resides. The Group Dispatch Session application 42 helps provide fast setup of group Voice over Internet Protocol (VoIP) communications.

Above session layer 40 is an application layer 44 where application programs 46 (e.g., H.323, H.324, etc.) to carry out desired functionality for a network device reside.

However, the protocol stack 20 is not limited to the protocol layers illustrated and more, fewer or other layers and protocols can also be used in protocol stack 20. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), Domain Name System (DNS), etc.), audio coder/decoders (CODEC), video codecs and protocols from other protocol suites may also be used in protocol stack 20.

During an audio/video conferencing call or a voice call on network devices 12, 14, 16, audio information is typically supplied by audio equipment (e.g., a handset, microphone/speaker, speaker-phone, etc.) that implements voice transmission functions and typically include at least one voice codec that sends and receives packetized voice to capture audio information.

For example, the audio codecs used in network devices 12, 14, 16 are compliant ITU-T G.711, G.722, G.723, G.728 and G.729 standards, the contents of which are incorporated herein by reference. Global System for Mobile Communications (GSM) codecs can also be used. As is known in the art, GSM is a digital cellular telephone technology widely used throughout Europe, in Australia, India, Africa, Asia, and the Middle East, and growing in use in the United States. The ITU-T GSM codec standards are incorporated herein by reference. However, other audio codecs could also be used and the present invention is not limited to such audio codecs.

During audio/video conference calling, video information is typically supplied by video equipment (e.g., video cameras, etc.) In one embodiment of the present invention, Motion Pictures Expert Group ("MPEG-2") codecs are used. As is known in the art, MPEG is a set of standards for audio and video compression established by the Joint ISO/IEC Technical Committee on Information Technology. The original MPEG standard for storing and retrieving video and audio information, was designed for CD-ROM technology.

As is known in the art, MPEG-1 defines data cell encoding for a medium bandwidth of up to 1.5 Mbps, two audio channels, and non-interlaced video. MPEG-2 is an extension of the MPEG-1 standard designed for broadcast television, including HDTV. MPEG-2 defines a higher bandwidth of up to 40 Mbps, five audio channels, a wider range of frame sizes, and interlaced video.

As is known in the art, MPEG-2 in general is defined in the ISO/IEC Standard JTC1/SC29/WG11, entitled "Coding of Moving Pictures and Audio," incorporated herein by reference. MPEG-2 is also defined by the ITU-T H.222.0, standard entitled "Generic coding of moving pictures and associated audio information," the contents of which is incorporated herein by reference. However, other audio/video and video codecs could also be used and the present invention is not limited to the MPEG codecs described.

Security and Encryption

Communications over communications network 18 often requires encryption or other types of security methods to provide secure communications between one or more or the plural network devices 12, 14, 16 for voice, video and/or data communications over communications network 18. The plural network devices 12, 14, 16 include one or more of the following security and/or encryption techniques.

Wireless Encryption Protocol ("WEP") (also called "Wired Equivalent Privacy") is a security protocol for WiLANs defined in the IEEE 802.11b standard. WEP is cryptographic privacy method, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

The IEEE 802.11 Working Group is working on a security upgrade for the 802.11 standard called "802.11i." This supplemental draft standard is intended to improve WiLAN security. It describes the encrypted transmission of data between systems 802.11xx WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access ("WPA") and Robust Security Network ("RSN").

WPA uses the same RC4 underlying encryption method as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption methods between wireless access points and wireless devices. The authentication schemes proposed in the draft standard include Extensible Authentication Protocol ("EAP"). One proposed encryption method is an Advanced Encryption Standard ("AES") encryption method.

Dynamic negotiation of authentication and encryption methods lets RSN evolve with the state of the art in security, adding methods to address new threats and continuing to provide the security necessary to protect information that WiLANs carry.

The NIST developed a new encryption standard, the Advanced Encryption Standard ("AES") to keep government information secure. AES is intended to be a stronger, more efficient successor to Triple Data Encryption Standard ("3DES"). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt ("EDE") mode of the DES cipher method. 3DES is defined in the ANSI standard, ANSI X9.52-1998, the contents of which are incorporated herein by reference. DES modes of operation are used in conjunction with the NIST Federal Information Processing Standard ("FIPS") for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption method that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified ("SBU") communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption methods.

Secure Hash Method (SHA), is used for computing a secure condensed representation of a data message or a data file. When a message of any length less than $2^{64}$ bits is input, the SHA-1 produces a 160-bit output called a "message digest." The message digest can then be input to other security techniques such as encryption, a Digital Signature Method (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 method is intended for digital signature applications, where a large file must be "compressed" in a secure manner before being encrypted with a private (secret) key under a public-key cryptosystem such as RSA. The IETF RFC-1321, entitled "The MD5 Message-Digest Method" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called message authentication codes. Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

As is known in the art, "firewalls" are a security feature used to protect a network from potentially hostile attacks from outside the network. For example, a firewall may protect the network devices from malicious attacks from the Internet or another network. Firewalls typically provide security services by filtering out data traffic that may be inappropriate, suspicious or dangerous. To implement filtering, a firewall is designed to interpret the type of data traffic that is being sent through it. The more information that a firewall has about transactions taking place through it, the more security it can provide.

Firewall security mechanisms include packet filtering. Packet filtering includes using the content of data packets passing through the firewall to determine if a packet should be allowed to pass through the firewall. For example, data-link layer addresses such as Media Access Control (MAC) and Logical Link Control (LLC) addresses, network addresses such as IP 28 addresses and source and destination transmission port numbers, such as TCP 32 or UDP 34 port numbers are used to filter data traffic.

As is known in the art, the HyperText Transport Protocol (HTTP) Secure (HTTPs), is a standard for encrypted communications on the World Wide Web. HTTPs is actually just HTTP over a Secure Sockets Layer (SSL). For more informaiton on HTTP, see IETF RFC-2616 incorporated herein by reference.

As is known in the art, the SSL protocol is a protocol layer which may be placed between a reliable connection-oriented network layer protocol (e.g. TCP 32/IP 28) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destingation at the start of establishing a protocol session. The SSL 2.0 protocol specification, by Kipp E. B. Hickman, 1995 is incorporated herein by reference. More information on SSL is available at the URL "netscape.com/eng/security/SSL_2.html."

As is known in the art, Transport Layer Security (TLS) provides communications privacy over the Internet. The protocol allows client/server applications to communicate over a transport layer (e.g., TCP 32, UDP 34) in a way that is designed to prevent eavesdropping, tampering, or message forgery. For more information on TLS see IETF RFC-2246, incorporated herein by reference.

In one embodiment of the invention, MAC address filtering is used. As is known in the art, MAC addresses are hardware addresses that are burned into a device during its manufacture and are unique for each device. Without MAC address filtering, any wired wireless client can request access to a wired or wireless network.

As is known in the art, a "tunnel" is used encapsulate or wrap a data packet or a data message from one protocol in a data packet or data message for another. The wrapped packet is then transmitted or "tunneled" via the protocol of the encapsulator or wrapper.

In one embodiment of the invention, Layer 2 Tunneling Protocol (L2TP) is used. As is known in the art, L2TP is a secure tunneling protocol used for connecting VPNs over public links such as those connected to the Internet. The IETF Internet Draft, Layer Two Tunneling Protocol, <draft-ietf-pppext-12tp-mpls-02.txt> is incorporated herein by reference.

In one embodiment of the invention, Internet Procol Security (IPsec) is used. As is known in the art, IPsec is security protocol that provides authentication and encryption over the Internet. Unlike SSL, which provides services at the transport layer 30 (e.g., OSI layer 4) and secures two applications, IPSec works at the network layer 26 (i.e., the OSI layer 3) and secures networks including VPNs. IPsec also provides secure communications for VPNs., For more information on IPsec see IETF RFC-2401, the contents of which are incorporated by reference.

However, the present invention is not limited to the security or encryption techniques described and other security or encryption techniques can also be used.

Security Module

In one embodiment of the present invention, the plural network devices 12, 14, 16 may include an additional security module for more efficient secure communications. The security module includes a software cryptographic engine with one or more cryptographic software modules. The one or more cryptographic software modules include one more types of cryptographic methods implemented in software to provide secure wired and wireless communications.

In one embodiment of the present invention, the software cryptographic engine includes software modules that support and conform to the NIST FIPS 197-2 specification for AES encryption and the NIST FIPS 46-3 specification for 3DES encryption.

In another embodiment of the present invention, the software cryptographic engine includes software modules that support and conform to the NIST FIPS 140-2 specifications for SBU use for secure wireless networking.

In another embodiment of the present invention, the software cryptographic engine includes software modules that support at least 64-bit and 128-bit WEP encryption.

In another embodiment of the present invention, the software cryptographic engine includes software modules that support at least 64-bit and 128-bit WEP, 128-bit, 192-bit and 256-bit AES and 168-bit 3DES encryption.

In another embodiment of the present invention, the software cryptographic engine includes software modules that support software modules that support and conform to the NIST FIPS 197-2 specification for AES encryption, the NIST FIPS 46-3 specification for 3DES encryption, NIST FIPS 140-2 specifications for SBU use for secure wireless networking, and the IEEE 802.11i specifications for WEP, WPA and RSN for secure wireless networking.

However, the present invention is not limited to these embodiments and the security module can include a software cryptographic engine with more, fewer or other combinations thereof of cryptographic software.

In one embodiment of the present invention, the security module includes a firewall that provides at least IP 28 address filtering, TCP 32/UDP 34 port filtering, and MAC/LLC address filtering.

The security module may further include a hardware cryptographic accelerator. In one embodiment of the present invention, the hardware cryptographic accelerator includes a PCI-based hardware cryptographic module. The hardware cryptographic accelerator includes low latency, high-throughput hardware to provide hardware based cryptography.

In one embodiment of the present invention, the hardware cryptographic module includes a 128-bit AES module with an electronic book code ("ECB") mode and a 168-bit 3DES module with ECB and cipher block chaining ("CBC") mode. However, the present invention is not limited to such an embodiment and other embodiments can also be used for the hardware cryptographic module.

In one embodiment of the present invention, the hardware cryptographic module is targeted for AES throughput to a Xilinix XC2V2000-5FG676 from Xilinix, Inc. of San Jose, Calif. with about 166,993 Xilinx gates (i.e., including about 33,000 application specific integrated circuit ("ASIC") gates) including a pipelined design that offloads cryptographic calculations from the processor. This hardware cryptographic module processes about 32-bytes in about 80 PCI clock cycles or about 107 Million-bit ("Mbits") per second ("Mpbs").

This hardware cryptographic module has provided AES encryption throughput on a wireless connection of about 4.53 Mbps compared to a throughput of about 4.6 Mbps on the same wireless connection without AES encryption.

In another embodiment of the present invention, the hardware cryptographic module is targeted for 3DES throughput to a Xilinix XC2V1000-4FG456 with about 95,000 Xilinx gates (i.e., including about 19,000 ASIC gates) including a pipelined design that offloads cryptographic calculations from the processor. The hardware cryptographic module processes about 24-bytes in about 60 PCI clock cycles or about 106.7 Mbits per second.

This hardware cryptographic module has provided 3DES encryption throughput on a wireless connection of about 4.4 Mbps compared to a throughput of about 4.6 Mbps on the same wireless connection without 3DES encryption.

In one embodiment of the invention, the security module also includes a security server creates and manages dynamic per session security keys (e.g., encryption keys) each time users desire a login. The security server also authenticates users by distributing and managing their individual security certificates (e.g., digital certificates).

However, the present invention is not limited to these specific hardware cryptographic modules and other hardware cryptographic modules with other designs, components and throughputs can also be used to practice the invention.

Voice Over Internet Protocol (VoIP) Communications

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, H.323, H.324, DNS, AAA, etc.) that convert a voice signal into a stream of packets (e.g., IP 28 packets) on a packet network and back again. VoIP allows voice signals to travel over a stream of data packets over a communications network 18.

As is known in the art, Session Initiation Protocol (SIP) supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, Service Location Protocol (SLP) provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of main family of video conferencing recommendations for IP networks. The ITU-T H.323 standards entitled "Packet-based multimedia communications systems" dated February 1998, September 1999, November 2000 and July 2003 are incorporated herein by reference.

As is known in the art, H.324 is a video conferencing recommendation using Plain Old Telephone Service (POTS) lines. The ITU-T H.324 standards entitled "Terminal for low bit-rate multimedia communication" dated February 1998 and March 2002 are incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

VoIP Group Dispatch Multi-Party Communications

Figure 3:
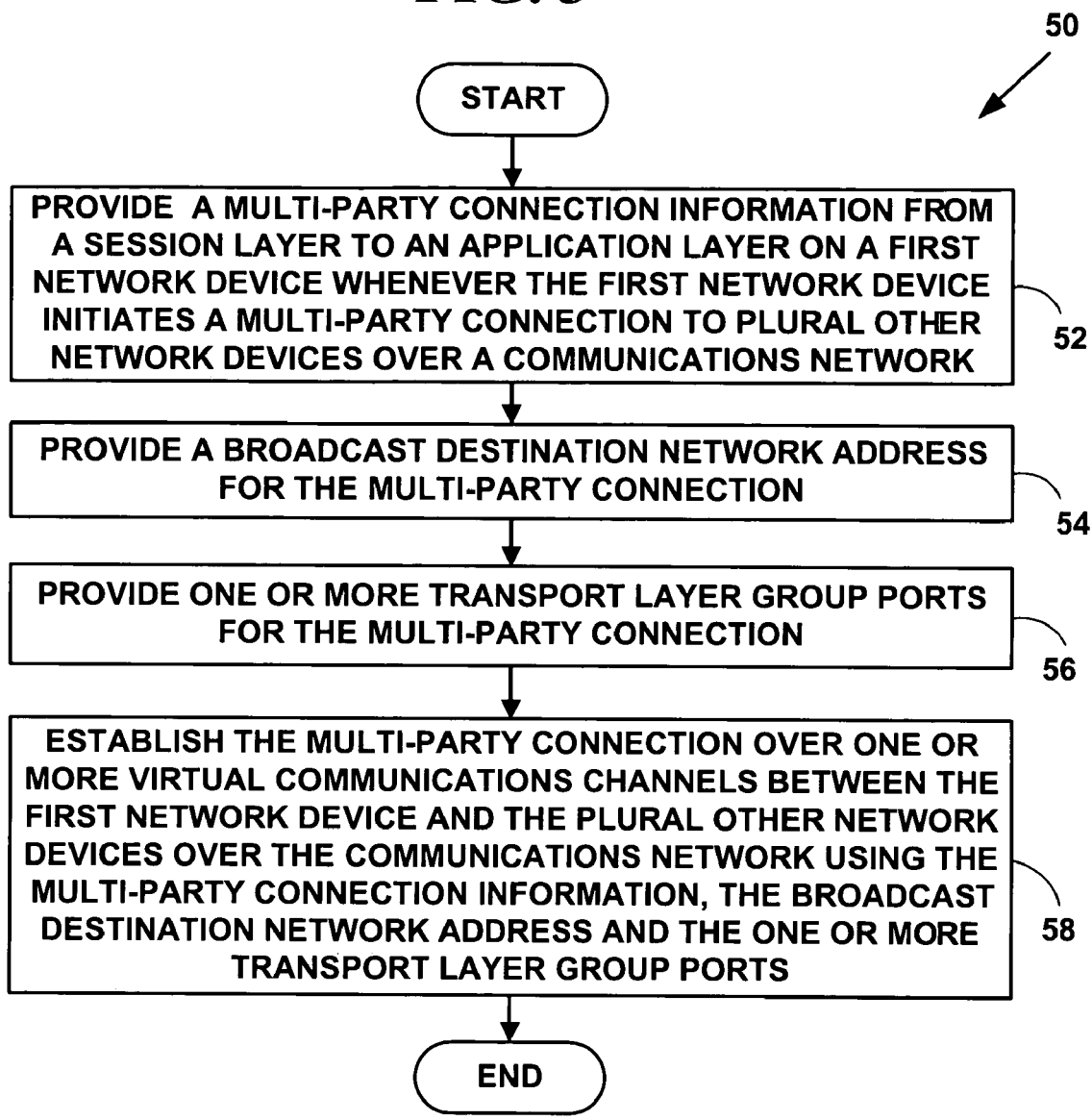
FIG. 3 is a flow diagram illustrating a method for providing multi-party connections over a communications network.

FIG. 3 is a flow diagram illustrating a Method 50 for providing multi-party connections over a communications network 18. At Step 52, multi-party connection information is provided from a session layer 40 to an application layer 44 on a first network device (e.g., 12) whenever the first network device 12 initiates a multi-party connection to plural other network devices 14, 16 over the communications network 18.

At Step 54, a broadcast destination network address is provided for the multi-party connection. At Step 56, one or more transport layer group ports are provided for the multi-party connection. At Step 58, the multi-party connection is established over one or more virtual communications channels between the first network device 12 and the plural other network devices 14, 16 over the communications network 18 using the multi-party connection information, the broadcast destination network address and the one or more transport layer group ports.

Method 50 is illustrated with one exemplary embodiment of the invention. However, the present invention is not limited to such an exemplary embodiment and other embodiments can also be used to practice the invention.

In such an exemplary embodiment at Step 52, a Group Dispatch Session application 42 in the session layer 40 is tunneled into one or more VoIP applications 46 (e.g., H.323, H.324, etc.) executing in the application layer 44 on a first network device 12 whenever the first network device 12 initiates a multi-party VoIP connection such as an audio and/or audio-video conference call to plural other network devices 14, 16 over the communications network 18 (e.g., the Internet). However, the present invention is not limited to tunneling and the multi-party connection information can be sent without tunneling.

The tunneling includes sending a Group Dispatch data message in a predetermined format including plural data message fields as is illustrated in Table 1. However, the present invention is not limited to the fields listed in Table 1, and more fewer or other fields can also be used to practice the invention.

TABLE 1

Group Dispatch Session application 42 version field (allows for new versions with new features).
Call Type (Group, Individual, End of Transmission).
Callee ID (Group Address or Individual Address).
Group ID (Group, Super Group, System Group, etc.).
Numerical Representation of Voice Compression Method (e.g., G.711, G.723, G.729, GSM, etc.)
Numerical Representation of Video Compression Method (e.g., MPEG-1, MPEG-2, etc.).
Numerical Representation of the Encryption method used.
Control Channel Group UDP 34 Port (dual channel only).
Traffic Channel Group UDP 34 Port.
Optional Broadcast IP 28 address (may be part of initialization data).
Packet sequence number information - This may be either implemented within the session layer or using a separate transport layer 30 (e.g. RTP 36).

Figure 4:
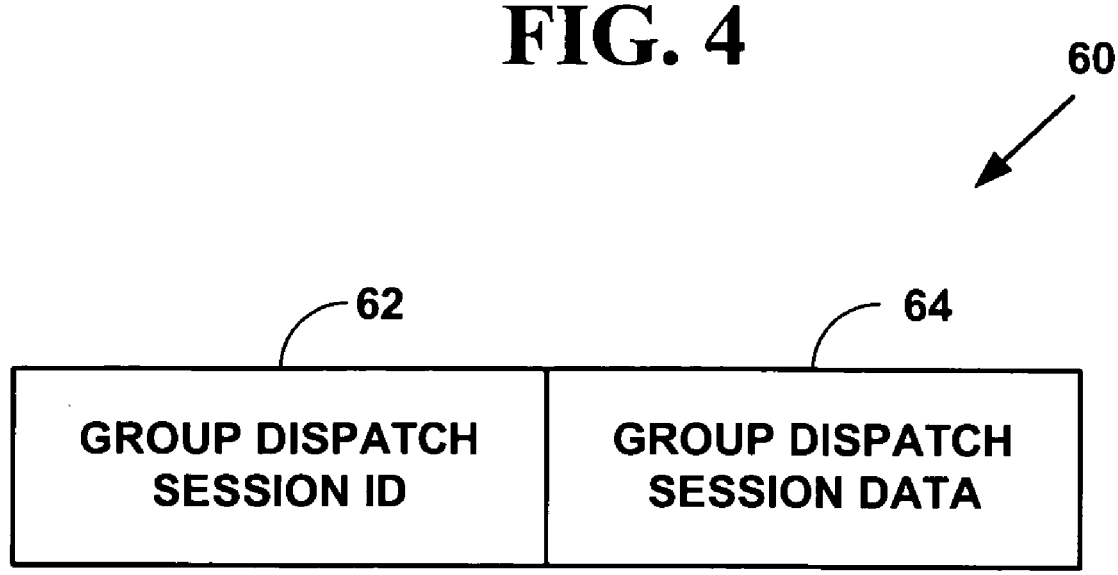
FIG. 4 is a block diagram illustrating a Group Dispatch Session application data message layout.

FIG. 4 is a block diagram illustrating a Group Dispatch Session application 42 data message layout 60. The data message layout 60 includes a Group Identifier portion 62 and a Group Data portion 64.

The Group Identifier portion 62 includes a message and Group identifier code in one or more fields. The message identifier is used to determine how to process subsequent VoIP group message data. The messages identifier codes may indicate the presence of a voice packet or pertinent control information (e.g., RTP 36, etc.)

The Group Data portion 64 includes data appropriate for the message id code. For voice packets it includes the information listed in Table 1 in separate fields.

The present invention provides a hierarchical structure of Group Identifiers including, but not limited to, Groups, Super Groups and System Groups. The hierarchical structure of Group identifiers provides at least the following (1) Group: prioritization users participating in a group dispatch voice communications can leave to participate in higher priority voice calls; (2) Super Groups: users selected to multiple groups can simultaneously receive important broadcasts; and (3) System Groups: users on different systems can simultaneously receive important broadcasts.

Returning to FIG. 3 at Step 54, a broadcast destination IP 28 address is provided (e.g. 192.168.202.255, etc.) for the multi-party VoIP connection. At Step 56, one or more pre-defined group UDP 34 ports for Group Dispatch VoIP users are provided.

At Step 58, the multi-party VoIP connection is established over one or more virtual communications channels between the first network device 12 and the plural other network devices 14, 16 over the communications network 18 using the multi-party a Group Dispatch Session 42 application connection information, the broadcast destination IP 28 address and the one or more group UDP 34 ports.

Group Dispatch VoIP

Group Dispatch VoIP is a stream-lined half-duplex version of VoIP tailored for fast setup time and efficient VoIP conference communications. The Group Dispatch Session application 42 provides, but is not limited to the following: (1) the ability to quickly transfer voice signals (i.e., voice packets) to another user or group of users quickly (e.g., typically less than about 250 ms setup time and average delay); (2) half-duplex voice communications; (3) ability for a Group Dispatch Session VoIP endpoint to scan other talk groups when idle; (5) ability for a caller to send location information in the Group Dispatch protocol 60 either as a separate message or embedded with the voice packets; (6) The Group Dispatch Session application 42 and protocol 60 also supports short test messaging (e.g., status messages) or other text messaging; and (7) the core protocol components include traditional VoIP layers (e.g., UDP 34, IP, 28 etc.).

There are at least two different implementations Group Dispatch VoIP including, but not limited to, a single virtual channel mode and a dual virtual channel mode. However, the invention is not limited to these two implementations and other implementations with more virtual channels or other implementations can also be used to practice the invention.

Single Virtual Channel Mode Group Dispatch VoIP

FIG. 5 is a flow diagram illustrating a Method 66 for providing multi-party connections over a communications network 18 over a single virtual channel. At Step 68, a connection is established to a transport layer 30 group port from an application layer 44 on a first network device (e.g., 12). The transport layer 30 group port is obtained from a session layer 40 application 42 when the first network device 12 initiates a multi-party connection between the first network device 12 and a plural other network devices 14, 16 over the communications network 18. At Step 70, voice and/or voice and video information is received on the first network device 12. At Step 72, the voice and/or voice and video information is compressed and digitized into plural data packets. At Step 74, the plural data packets are sent via the transport layer 30 group port to a network layer 26. At Step 76, the plural data packets are transmitted from the network layer 26 to a broadcast destination network address for the multi-party connection, thereby establishing the multi-party connection over one virtual communications channel between the first network device 12 and the plural other network devices 14, 16 over the communications network 18.

Method 66 is illustrated with one exemplary embodiment of the invention. However, the present invention is not limited to such an exemplary embodiment and other embodiments can also be used to practice the invention.

In such an exemplary embodiment at Step 68, when a first network device 12 including a Group Dispatch Session application 42 powers up, it opens a Group Dispatch socket to the Group Dispatch group UDP 34 port and the group broadcast destination IP 28 address. As is known in the art, a "socket" comprises an identifier for a particular service on a particular node on a network. The Group Dispatch socket comprises a broadcast network address (e.g., IP 28) and a group port number (e.g., UDP 34, TCP 32, etc.) which identifies a service (e.g., VOIP). However, the present invention is not limited to sockets and the virtual channels can be created using other techniques.

In one embodiment, the group broadcast destination IP 28 address is sent in a Group Dispatch Session application 42 data message 60. In another embodiment of the invention, the group broadcast destination IP 28 address is included as a portion of initialization data for the Group Dispatch Session application 42 and is not sent in a Group Dispatch Session application 42 data message 60.

At Step 70, voice information is received on the first network device 12 When a Press-To-Talk (PTT) or similar button is pressed or other voice input device is activated, voice information is received. Video information may also be received from a camera or other video device. Such voice and/or voice-video information is received via an application program 46 (e.g., H.323, H.324, etc.) in the application layer 44.

At Step 72, the voice (and/or voice and video) information is compressed and digitized into plural data packets. The initiating first network device 12 digitizes and compresses (e.g., using G.723, G.729, G.711, GMS, etc.) voice signals from the microphone, (video signal from the camera using MPEG, etc.) applies the appropriate network header information (e.g., Group ID/UDP 34/IP 28), and begins sending the data packets to the communications network 18.

Since the plural network devices 12, 14, 16 have the Group Dispatch Session application 42 and thereby have the same voice and video compression capabilities, there is no need for this exchange of information (e.g., like in H.323 or SIP, etc.), thus reducing network overhead. Some VoIP groups may require encrypted broadcasts of the voice information. An encryption field in the Group Dispatch Session application 42 data message header 62 will indicate the voice packet is encrypted.

At Step 74, the plural data packets are sent via the group UDP 34 port in the transport layer 30 to an IP 28 application in the network layer 26. At Step 76, the plural VoIP data packets are transmitted from the IP 28 application to a group broadcast destination IP 28 address for the multi-party connection, thereby establishing the multi-party connection over one virtual communications channel between the first network device 12 and the plural other network devices 14, 16 over the communications network 18 using the group broadcast IP 28 address and the Group UDP 32 port. The multi-party connection includes an N-way audio or audio-video conference call.

Since the IP 28 address is a group broadcast IP 28 address, the VoIP data packets are transmitted through APs throughout a given communications network 18 subnet. Roaming between APs is an inherent part of a wireless VoIP system and typically requires rerouting of data packets from one AP to another AP during handoff. Since all voice packets are broadcasted on the communications network 18 to every AP, the complexity of the hand-off scheme is significantly reduced because re-routing packets isn't required. In addition, using a group broadcast destination IP 28 address in conjunction with a Group Dispatch server (described below) also makes subnet roaming easier. For units roaming between AP's, the roaming time is significantly reduced because the voice packets are broadcast through AP's.

Group Dispatch Session application 42 equipped network devices receive VoIP packets and filter them at the application layer 44 for the correct Group ID. If this Group ID field matches, the audio packets are decompressed and played out the speaker and the Group ID of the transmitter is displayed on a display (i.e., if a display is available).

When the PTT button is released or audio input ceases, the first network device 12 disables its microphone, stops sending VoIP packets and sends an end of transmission packet. The plural other network devices 14, 16 correspondingly stop decompressing voice packets and disable their speakers respectively. This ends the N-way VoIP conference call over the virtual channels.

FIG. 6 is a data flow diagram illustrating an exemplary data flow 78 for Method 66. The multi-party connection is established over one virtual communications channel between the first network device 12 and the plural other network devices 14, 16 over the communications network 18. The multi-party connection includes an audio or audio-video VoIP N-Way conference call.

Dual Virtual Channel Mode Group Dispatch VoIP

The dual channel mode includes two virtual channels. The two virtual channels include, but are not limited to a virtual control channel and virtual traffic channel. However, the present invention is not limited to this embodiment and more or other virtual channels can also be used to practice the invention.

Figure 7B:
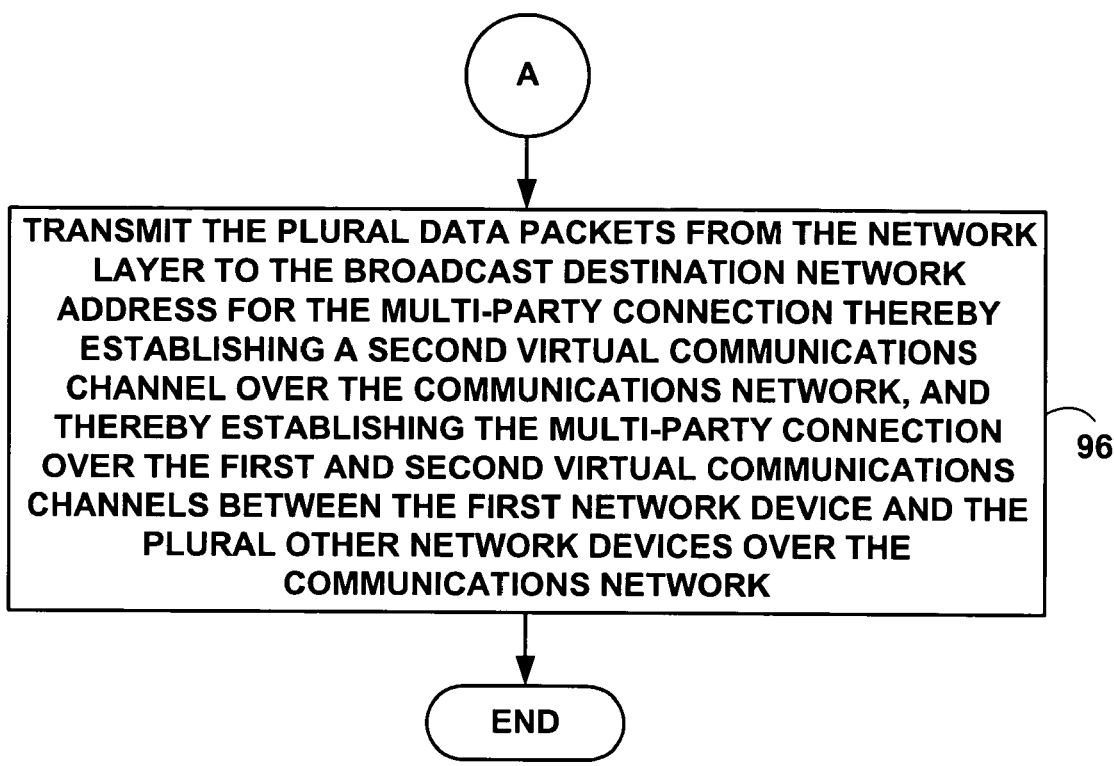

FIGS. 7A and 7B are a flow diagram illustrating a Method 80 for providing multi-party connections over a communications network 18 over dual virtual channels. In FIG. 7A at Step 82, a connection is established to a first transport layer 30 group port from an application layer 44 on a first network device (e.g., 12) The first transport layer 30 group port and a second transport layer 30 group port are obtained from a session layer application 42 when the first network device 12 initiates a multi-party connection between the first network device 12 and plural other network devices 14, 16 over the communications network 18. At Step 84 one or more control data packets are sent via the first transport layer 30 group port to a network layer 26. At Step 86, the one or more control data packets are transmitted from the network layer 26 to a broadcast destination network address for the multi-party connection thereby establishing a first virtual communications channel over the communications network 18. At Step 88, voice information is received on the first network device. At Step 90, a status of the second transport layer 30 group port is set to busy. At Step 92, the voice information is compressed and digitized into plural data packets. At Step 94, the plural data packets are sent via the second transport layer 30 group port to the network layer 26.

In FIG. 7B at Step 96, the plural data packets are transmitted from the network layer 26 to the broadcast destination network address for the multi-party connection thereby establishing a second virtual communications channel over the communications network 18. The multi-party connection is established over the first and second virtual communications channels between the first network device and the plural other network devices over the communications network.

Method 80 is illustrated with one exemplary embodiment of the invention. However, the present invention is not limited to such an exemplary embodiment and other embodiments can also be used to practice the invention.

In such an exemplary embodiment in FIG. 7A at Step 82, when the first network device 12 including a Group Dispatch Session application 42 powers up, it opens a Group Dispatch socket to a Group Dispatch virtual control channel group UDP 34 port and the group broadcast destination IP 28 address. The first network device 12 listens on this socket for VoIP session initialization and uses a VoIP session initialization message to determine whether it will accept a new conference call.

At Step 84, the Group Dispatch Session application 42 periodically sends one or more control data packets to via the virtual control channel group UDP 34 port in the transport layer 30 to an IP 28 application in the network layer 26. At Step 86, the IP 28 application transmits the one or more control data packets from the network layer 26 to the group broadcast destination IP 28 address thereby establishing a VoIP virtual control channel over the communications network 18.

At Step 88, voice information is received on the first network device 12. When a Press-To-Talk (PTT) or similar button is pressed or voice input is activated via a microphone voice information is received. Video information may also be received from a camera or other video device. Such voice and/or voice-video information is received via an application program 46 (e.g., H.323, H.324, etc.) in the application layer 44.

At Step 90, a second Group Dispatch virtual traffic channel group UDP 34 port is marked as busy. (e.g., This is done even if a VoIP conference call is not accepted to ensure the group UDP port34 is available).

At Step 92, the voice (and/or voice and video) information is compressed and digitized into plural data packets. The first network device 12 digitizes and compresses voice signals from the microphone and applies the appropriate network header information (e.g., Group ID, RTP 36, UDP 34, IP 28) on the virtual traffic channel group UDP 34 port. Video signals may also be digitzed and compressed.

At Step 94, the plural voice data packets are sent to an IP 28 application 28 that begins sending to the communications network 18 sending the plural data packets via the broadcast group destination IP 28 address thereby establishing a second virtual communications channel over the communications network.

This establishes an N-way VoIP audio or audio-video conference call over the first and second virtual communications channels between the first network device 12 and the plural other network devices 14, 16 over the communications network 18.

In FIG. 7B at Step 96, the VoIP packets are transmitted as available on the virtual traffic channel group UDP 34 port. The original control channel packet is re-sent periodically on the virtual control channel group UDP 34 port in case there are any Group Dispatch network devices that recently entered wireless coverage area, etc. Since the IP 28 address is a broadcast destination IP 28 address, the VoIP packets will be transmitted through all AP's throughout a given subnet.

Network devices with the Group Dispatch Session application 42 receive the virtual control channel data packets. If the Group/Individual ID field matches, a one or more sockets (i.e., a new virtual traffic channel) is opened to the group UDP 34 port included in the control channel message. Any packets received on the virtual traffic channel are decompressed and played out the speaker and/or video display.

If the traffic channel UDP 34 group port is currently in use by another session, the new VoIP session's traffic is still received, but it will be discarded by the Group/individual ID filter.

When the PTT button is released, the first network device 12 disables its microphone, sends an end of transmission packets on both the virtual traffic channel and virtual control channel. The other network devices 14, 16 close their virtual traffic channel socket; stop decompressing voice packets and stop disable the speaker. There is timeout interval that would cause the end of transmission to be assumed after an interval of time.

The end of transmission packet triggers the receiving network devices to update the status of this group UDP 34 port in the pool of available traffic channel ports. This group UDP port may then be re-used after the proper delay to ensure all packets from the previous call have been flushed from the network (e.g., after approximately 2 minutes).

FIG. 8 is data flow diagram illustrating a data flow 98 for Method 80. The use of a virtual control channel and virtual traffic channel is illustrated.

When a called party connects to the group UDP 34 port specified in the control channel, the called party will send a control channel message directly to the calling party to indicate that the called party has connected and is listening. If the called party fails to connect to the group UDP 34 port, the called party may also send a control channel message directly to the calling party to indicate a connection failure.

The calling party also has the capability to know the list of calling parties in a group, and may display a list of calling parties that have connected, that can not connect, and that have not connected. In either implementation, VoIP conversations take place through transmission back and forth by different network device users.

The described implementations have the following differences: (1) The single virtual channel mode is less complex; and (2) the dual virtual channel mode provides group filtering at a lower level (network layer 26, rather than the application layer 44) and therefore may be more robust to loading from simultaneous VoIP N-way conference voice calls.

In one embodiment of the invention, a Group Dispatch server is added to each subnet on communications network 18. In another embodiment of the invention, a Group Dispatch server is not added to each subnet on communications network 18. These Group Dispatch servers communicate between each other and listen to the group dispatch traffic on their subnet. They can be configured to allow certain or all Group Dispatch VoIP traffic transferred between subnets of the network system.

In one embodiment of the invention, a single Group Information Manager (GIM) is added to each communications network 18. The single GIM is capable of managing all of the subnets that are using the Group Dispatch VoIP system. The GIM allows each network device to retrieve information about the groups on the current subnet. In another embodiment of the invention, more than one GIM is used. Information which can be managed by the GIMs include, but are not limited to: (1) active groups on that subnet; (2) Group IDs for all valid users of a group; (3) common Information about Group IDs that would allow for dynamic definitions of fields (e.g., common name, job title, Office location, etc.); and (4) Groups that require encryption codes.

User classification of VoIP services like using IEEE 802.3p/q (i.e., CSMA/CD Ethernet based LANs) or Differentiated Services (DiffServ) also help alleviate some of the VoIp network loading problems. The sender can mark the 802.3p/q headers or the DiffServ Type Of Service (TOS) service quality bits based on the hierarchical Group ID structure. This allows the communications network 18 to assign priority to important groups that are trying to transmit via VoIP.

In one embodiment of the invention, DiffServ processing is performed at the network layer 26 by the TCP 32/IP 28 applications. The sender marks the DiffServ field in the IP 28 header of all voice packets with its Group/individual ID. When a receiving network device gets a call setup message, it configures its DiffServ classifier with the Group/individual ID. Incoming voice packets whose DiffServ field corresponds to its Group/individual ID are placed in high priority queues and all other packets are either dropped or classified at a lower priority.

The Group Dispatch virtual control channel can readily transfer additional information including but limited to: expanding the feature sets of the Group Dispatch VoIP system.

The method and system provides Land Mobile Radio type features on IP 28 networks utilizing a thin IP 28 application based dispatch protocol 60 via VoIP. This protocol can be used for Wired LAN (e.g. Ethernet) and WiLAN (e.g., 802.11a, 802.11b, 802.11g, 802.11xx, 802.16xx, Bluetooth, etc.) other types of wireless and wired communications networks 18. The method and system allow this functionality to be added to Personal Computer's, Tablet PC's, PDA's (Pocket PC, Palm, etc.), and a host of other network devices. The method and system can also be used to distribute packet video from a single server to multiple clients.

The method and system may provide, but is not limited to, providing the following: (1) low signaling overhead; (2) fast setup-time, low-bandwidth half-duplex conference (group) voice communications; (3) for network devices roaming between AP's, the roaming time is significantly reduced because voice packets are broadcast through all AP's; (4) minimal additional components or subsystems added to the network—no Gatekeepers, etc.; and (5) late entry for network devices not available during original group call initiation.

The invention was illustrated using several examples of three-way conference calling. However, the present invention is not limited to three-way conference calling and can be practiced with N-way audio and/or audio-video conference VoIP calling.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments and equivalents that come within the scope and spirit of the following claims are claimed as the invention.

We claim:

1. A method for providing multi-party connections over a communications network, comprising:

establishing a Voice Over Internet Protocol (VoIP) connection to a first transport layer group port from an application layer on a first network device, wherein the first transport layer group port and a second transport layer group port are obtained from a session layer application when the first network device initiates a multi-party VoIP connection between the first network device and a plurality of other network devices over the communications network, wherein the session layer application includes a group dispatch session application executing in the session layer that securely tunnels into one or more VoIP applications executing in the application layer using a pre-determined tunneling protocol and wherein the first transport layer group port and a second transport layer group port use a pre-determined transport layer security protocol;

sending one or more control data packets to via the first transport layer group port to a network layer;

transmitting the one or more control data packets from the network layer to a broadcast destination network address for the multi-party connection thereby establishing a first virtual communications channel over the communications network;

receiving voice information on the first network device;

changing a status of the second transport layer group port to busy;

compressing and digitizing the voice information into a plurality of data packets;

sending the plurality of data packets via the second transport layer group port to the network layer; and transmitting the plurality of data packets from the network layer to the broadcast destination network address for the multi-party VoIP connection thereby establishing a second virtual communications channel over the communications network, and thereby establishing the multi-party VoIP connection over the first and second virtual communications channels between the first network device and the plurality of other network devices over the communications network.

2. The method of claim 1 further comprising a computer readable medium having stored therein instructions for causing a processor to execute the steps of the method.

3. The method of claim 1 wherein the communications network includes an Internet Protocol (IP) data network.

4. The method of claim 1 wherein the broadcast destination network address includes a broadcast Internet Protocol (IP) destination address.

5. The method of claim 1 wherein the first and second transport layer group ports include group User Datagram Protocol (UDP) ports.

6. The method of claim 1 wherein the pre-determined transport layer security protocol includes Transport Layer Security (TLS) protocol.

7. The method of claim 1 wherein the multi-party Voice-over-Internet Protocol (VoIP) connection includes an audio conference multi-party connection or an audio-video conference multi-party connection.

8. The method of claim 1 wherein the first virtual channel includes a virtual control channel and the second virtual channel includes a virtual traffic channel.

9. The method of claim 1 wherein the first virtual channel is a Voice-over-Internet Protocol (VoIP) control channel and the second virtual channel is a VoIP virtual traffic channel.

10. The method of claim 1 wherein the pre-determined tunneling protocol includes Layer 2 Tunneling Protocol (L2TP).

11. The method of claim 1 wherein the multi-party VoIP connection information includes a session layer application version, a group identifier, a call type, a callee identifier, a voice compression indicator, a video compression indicator, an encryption indicator, a transport layer group port control channel port, a transport layer group port traffic channel port or data packet sequence information.

12. A system for providing multi-party Voice Over Internet Protocol (VoIP) connections over a communications network, comprising in combination:

means for establishing a Voice Over Internet Protocol (VoIP) connection to a first transport layer group port from an application layer on a first network device, wherein the first transport layer group port and a second transport layer group port are obtained from a session layer application when the first network device initiates a multi-party VoIP connection between the first network device and a plurality of other network devices over the communications network, wherein the session layer application includes a group dispatch session application executing in the session layer that securely tunnels into one or more VoIP applications executing in the application layer using a pre-determined tunneling protocol and wherein the first transport layer group port and a second transport layer group port use a pre-determined transport layer security protocol and sending one or more control data packets to via the first transport layer group port to a network layer, for transmitting the one or more control data packets from the network layer to a broadcast destination network address for the multi-party connection thereby establishing a first virtual communications channel over the communications network; and means for receiving voice information on the first network device, changing a status of the second transport layer group port to busy, compressing and digitizing the voice information into a plurality of data packets, sending the plurality of data packets via the second transport layer group port to the network layer and for transmitting the plurality of data packets from the network layer to the broadcast destination network address for the multi-party VoIP connection thereby establishing a second virtual communications channel over the communications network and thereby establishing the multi-party VoIP connection over the first and second virtual communications channels between the first network device and the plurality of other network devices over the communications network.

13. The system of claim 12 wherein the pre-determined tunneling protocol includes Layer 2 Tunneling Protocol (L2TP).

14. The system of claim 12 wherein the pre-determined transport layer security protocol includes Transport Layer Security (TLS) protocol.

* * * * *